Feb. 19, 1935.  A. H. BRODEN  1,991,653
DECAFFEINIZER AND COFFEE SAVER
Filed April 10, 1934
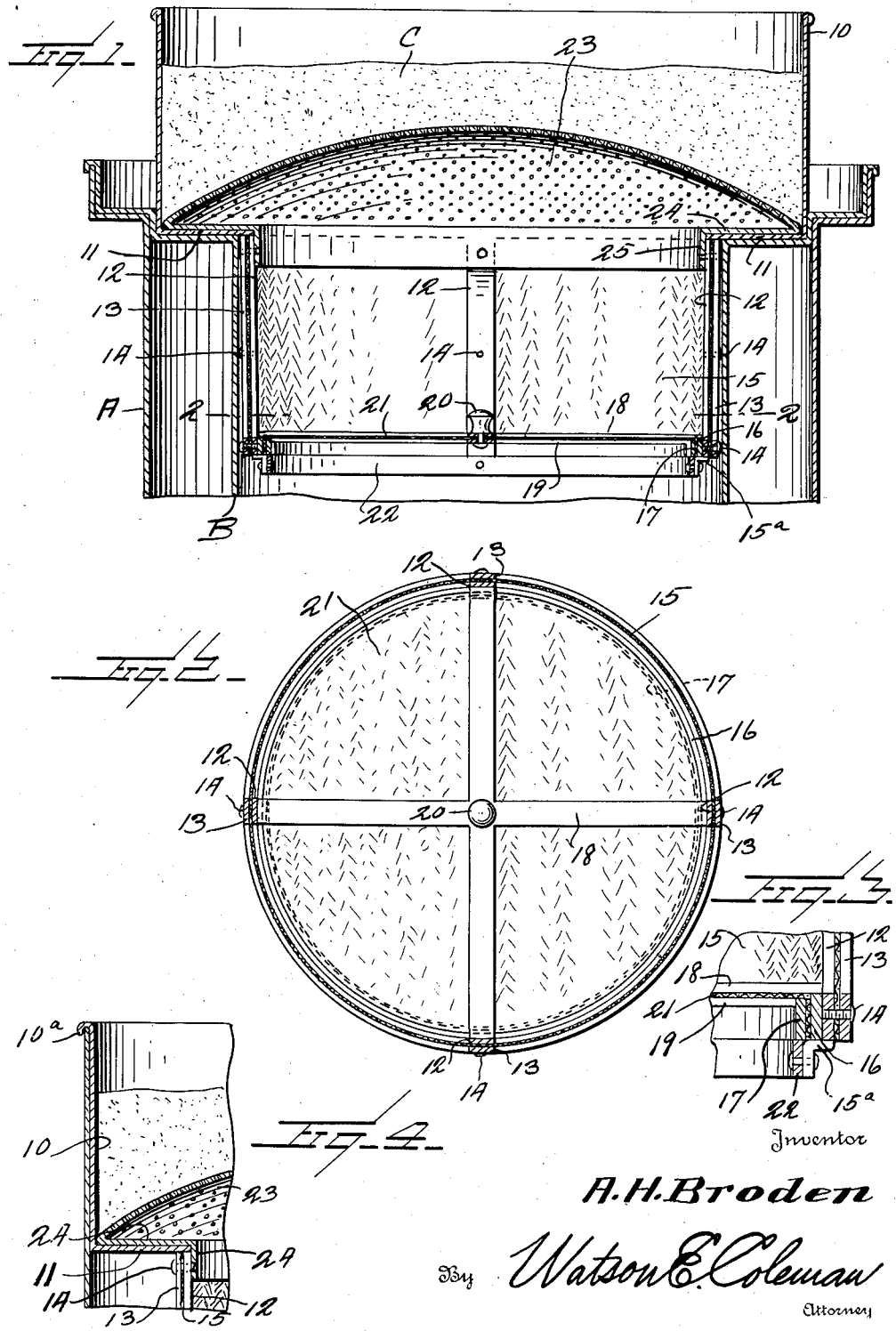
Inventor
A.H.Broden
By Watson E. Coleman
Attorney Patented Feb. 19, 1935

1,991,653

UNITED STATES PATENT OFFICE 1,991,653

DECAFFEINIZER AND COFFEE SAVER

Albert H. Broden, San Antonio, Tex.

Application April 10, 1934, Serial No. 719,938

2 Claims. (Cl. 53—3)

This invention relates to devices for removing from coffee the caffein and removing thein and tannin from tea, the general object of the invention being to provide a device which may be readily applied to coffee urns or teapots and which is so constructed that while all the aroma and fragrance of the tea or coffee is retained, yet in which almost all of the caffein and tannin of the coffee and the thein and tannin of the tea are withheld or separated.

There are three chemical substances in coffee, namely, the oil which gives the aroma, caffein and tannin and, as before stated, the caffein and tannin are deleterious to the human system and, therefore, much of the coffee on the market is decaffeinized.

As before stated, the object of the present invention is to provide a simple appliance adapted to be used in connection with a coffee urn or pot and inserted within the same, which supports a bed of coffee but permits the passage of water rapidly through the bed and which provides a trap as it were for catching any possible coffee grounds and preventing these coffee grounds from entering the pot itself, thus making it possible to carry down with the boiling water aromatic oil of the coffee without touching the caffein and tannin which, to be removed from the coffee itself and carried into the water, must be either steeped or boiled to some extent.

A further object is to provide in a device of this kind a perforated plate of German silver or the like which supports the bed of coffee and below this a bag, as it may be termed, of fabric woven of linen threads extending in one direction and silver threads extending in the other direction, the purpose of the silver threads being to reinforce the linen and to help retain the caffein to some extent.

Other objects will appear in the course of the following description.

My invention is illustrated in the accompanying drawing, wherein:—

Figure 1 is a vertical sectional view through the upper portion of a coffee urn and showing my decaffeinizer disposed therein;

Figure 2 is a section on the line 2—2 of Figure 1 but omitting walls of the coffee urn;

Figure 3 is a fragmentary vertical section on an enlarged scale;

Figure 4 is a fragmentary vertical section showing my decaffeinizer applied to another form of coffee pot.

Referring to the drawing, it will be seen that I have illustrated a coffee urn having an outer wall A and an inner wall B. This is merely illustrative of the fact that my appliance may be used with a coffee urn. The appliance consists of a symmetrical hopper-shaped portion designated 10 having any desired diameter, the wall 10 being inwardly extended at 11.

Extending downward from the inward extension of the wall 11 are a plurality of metal strips 12 which are preferably integral with the wall 11. The walls 10, 11 and the strips 12 are preferably made of German silver, aluminum or the like.

Disposed parallel to the strips 12 and extending downward in opposed relation thereto are the vertical strips 13. Screws 14 extend through these two sets of strips and hold them in conjunction with each other and support a layer of cloth designated 15 between the two series of strips. This cloth is made of linen and silver threads and extends in the form of a cylinder. The lower ends of the strips 12 are inwardly and then downwardly bent as at 15ª and resting upon the ledge so formed are a pair of rings 16 and 17, the outer ring 16 having radial strips 18 while the inner ring has radial strips 19. These strips overlie each other. These strips 18, 19, of course, cross at the center of the utensil and are held in engagement with each other at this point by a knob 20. Disposed between the strips 18 and 19 is a cloth 21 formed of silver and linen threads, as heretofore stated, the margin of this cloth being bent downward to extend between the rings 17 and 16, the rings 17 constituting a clamping ring holding the cloth in place against the ring 16. This bottom, as it may be called, for the bag 15 may be readily removed but has liquid-tight contact with the cloth 15 so that all the liquid passing downward into the bag formed of the parts 15 and 21 must pass through this cloth.

The angularly bent ends of the strips 12 are connected by a ring 22 riveted to these angularly bent ends. It will be seen that the screws 14 pass through the strips 13 and 12 and through the cloth 15, thus clamping the cloth 15 in place.

Adapted to be supported upon the inwardly extending portion 11 of the body 10 is a metal screen designated generally 23 which is concavo-convex and provided with a large number of very fine perforations. At its periphery, the metal of the screen is extended inward at 24 and then extends downward at 25 to form a neck insertible into the space defined by the strips 12 and this neck is adapted to be held to the strips 12 by the upper screws 14. The purpose of having the screen concavo-convex is to secure the greatest possible area of perforated portion. This screen is preferably made of German silver, aluminum or the like and is intended to support a layer of pulverized coffee designated C.

The reason for using German silver for the screen, for the body 10 and the strips 13 and 12 and rings 16, 17 and 22, is that German silver is very durable but lighter and cheaper than real silver. It does not rust, nor does it corrode, nor does it release its metallic elements on coming in contact with acids or alkaloids.

The cloth bag formed by the parts 15 and 21 is woven of silver crossed with linen threads in the ratio of 1 to 1. The purpose of using the silver threads is two-fold in that the silver threads reinforce the linen threads and also help to retain the caffein. The fabric, however, is dense enough to allow the water to pass through within the space of about four minutes as it is being drawn through the faucet of the urn and poured through the top. The purpose of putting the cloth between the upright strips and holding the cloth in place by the screws is to hold the cloth firmly in place, preventing any tendency of the cloth to sag or get out of place, and yet permit the cloth to be removed and renewed when necessary. In actual practice, this cloth secures a retention of about 85% of caffein and it is intended that once a month a chemical analysis of the coffee shall be made in order to determine the caffein content and if it shows that there is a lesser caffein retention than 85%, this shows that the material has worn to some extent and should be promptly replaced.

In the use of this invention for coffee, the attachment is placed inside of the coffee urn or coffee pot. A quart of boiling water is poured through the decaffeinizer into the urn. Then place the necessary amount of dry, pulverized coffee on the top screen. A quart of boiling water is then poured over the coffee slowly allowing time enough to run through the second screen bottom. This is done as many times as is practicable until the desired strength has been secured. When this has been done, the attachment is removed, washed, cleaned, dried and hung up ready for the next operation. When the boiling water is poured on pulverized coffee, the oil in the coffee is immediately dissolved and carried downward into the coffee urn, this being particularly true if coffee is pulverized. Because of the rapidity with which the water passes downward, however, the caffein and tannin have hardly been touched, it being necessary that the ground or pulverized coffee must be steeped or boiled in order to dissolve the caffein and tannin. Inasmuch as not a speck of the coffee grounds finds its way to the bottom of the coffee urn because these grounds are caught by the bag formed by the cloth 15 and 21, it makes it impossible to dissolve the caffein and tannin from the coffee so that the coffee is not bitter. The same is true of making tea. In this case, of course, the tea is finely pulverized and then the boiling water poured through it in the same way as with the coffee. The thein and tannin will then be retained within the tea leaves because the tea leaves are not subjected to any steeping action, as no particle of tea finds its way to the bottom of the pot.

It will be seen that my device permits the quick passage of the water through the bed of coffee and downward into the urn and this greatly decreases the chances of tannin or coffee being taken from the coffee itself. I have found in actual practice, this device saves about half of the coffee because of the double straining process and the pulverization of the coffee releases its entire strength and also saves half the sugar as it does not require a large amount of sugar in order to overcome the bitterness of the ordinary coffee.

The taste of the coffee is greatly improved and it can be taken by any one regardless of how nervous the person is and without affecting their sleep.

It will be noted that in Figure 4 I have illustrated the fact that the body 10 may be used in connection with a coffee pot which is not provided with the inner wall. In this case, the upper end of the cylinder 10 or body can engage the upper edge of the pot by the overturned lip or flange 10ª.

The purpose of using a combination of linen and silver threads in the cloth sections 15 and 21 is merely to stiffen the cloth and make it retain its shape better. When I speak of silver threads, I mean threads of fabric such as linen which are wrapped with a thin strip of silver to thus stiffen the threads so that the linen will keep its shape better than if the cloth was formed of linen threads alone.

I claim:—

1. An article for the purpose described including a cylindrical body having an inwardly extending annular flange at its lower end, the flange being continued downward in the form of a plurality of vertical strips, and at their ends these strips being formed to provide inwardly extending portions, outer strips disposed over the first named strips, a cylindrical cloth of textile fabric extending around and exteriorly to the inner or first named strips and overlaid by the second named strips, screws passing through the outer strips, cloth and the inner strips and detachably holding these parts to each other, a bottom comprising an inner ring and an outer ring adapted to rest upon the inwardly extending ends of the first named strips and be supported thereby, the outer and inner rings having radial strips, a cloth disposed between the outer and inner radial strips and having its margin extending downward between said rings, the cloth being clamped thereby, and a metal screen adapted to be removably disposed within the body, the margin of the metal screen extending inward and then downward and fitting on the inside of the inner first-mentioned strips, said screen being upwardly convex and being finely perforated.

2. An article for the purpose described including a cylindrical body having an inwardly extending annular flange at its lower end, the flange being continued downward in the form of a plurality of vertical strips, and at their ends these strips being formed to provide inwardly extending portions, outer strips disposed over the first named strips, a cylindrical cloth of textile fabric extending around and exteriorly to the inner or first named strips and overlaid by the second named strips, screws passing through the outer strips, cloth and the inner strips and detachably holding these parts to each other, a bottom comprising an inner ring and an outer ring adapted to rest upon the inwardly extending ends of the first named strips and be supported thereby, the outer and inner rings having radial strips, a cloth disposed between the outer and inner radial strips and having its margin extending downward between said rings, the cloth being clamped thereby, a metal screen adapted to be removably disposed within the body, the margin of the metal screen extending inward and then downward and fitting on the inside of the inner first-mentioned strips, said screen being upwardly convex and being finely perforated, the cloth disposed between the outer and the inner vertical strips and between the strips of the bottom being woven of linen threads extending in one direction and German silver threads extending in the opposite direction.

ALBERT H. BRODEN.